United States Patent [19]

Eickmann

[11] 4,310,203
[45] Jan. 12, 1982

[54] HYDROSTATIC SUPPORT ASSEMBLY

[76] Inventor: Karl Eickmann, 2420 Isshiki, Hayama-machi, Kanagawa-ken, Japan

[21] Appl. No.: 122,926

[22] Filed: Feb. 20, 1980

Related U.S. Application Data

[62] Division of Ser. No. 954,555, Oct. 25, 1978.

[51] Int. Cl.³ .............................................. F16C 32/06
[52] U.S. Cl. ........................................ 308/9; 308/26; 308/121; 308/160
[58] Field of Search ................. 308/9, 26, 35, 63, 72, 308/73, 121, 160

[56] References Cited

U.S. PATENT DOCUMENTS 3,499,692 3/1970 Kaiser ............................... 308/35 X
4,092,048 5/1978 Bennett et al. ..................... 308/35 X Primary Examiner—Frederick R. Schmidt

[57] ABSTRACT

In radial bearings of mechanical nature the life time id is limited. In hydrostatic bearings the lateral loads may over time or even quickly deform the bearing and make it less effective. The invention overcomes this problem by providing not a hydrostatic bearing, but mechanical bearings to revolvable members and a hydrostatic support member, which carries the major portion of the load. The hydrostatic support member is radially flexibly mounted in order to adapt itself for proper support of the mechanical bearings. The device is also very convenient for hydrostatic pumps and motors with radially expanding and contracting working chambers.

24 Claims, 4 Drawing Figures

HYDROSTATIC SUPPORT ASSEMBLY

REFERENCE TO RELATED APPLICATION

This is a divisional application of my co-pending patent application, Ser. No. 954,555 which was filed on Oct. 25 th, 1978.

DISCUSSION OF THE FORMER ART

Commonly commercially available and standardized ball-bearings or roller bearings are used to bear a revolvable member. But sometimes radial hydrostatic bearings are used. The ball-or roller-bearings have a limited life time. The hydrostatic radial bearings have theoretically, when suitably designed and build, an eteral life. However, the hydrostatic bearing is basically designed to carry a load, but not designed a centre a revolvable member or to carry its inclined load, which may be excerted onto it by lateral forces endwards of the bearings.

The known bearings are therefore perfect for their specific applications but not perfect for newer applications, where the specific values of both kinds of bearings are desired.

BACKGROUND OF THE INVENTION

It has been found, that neither the ball-or roller-bearings, in short, mechanical bearings, nor the hydrostatic radial bearings are fully capable of supplying, what is wanted from them in certain newer high—capacity applications. For example in hydrostatic pumps or motors. The invention therefore discovered, that a noval kind of bearing might bring the solution. It is neither a pure mechanic, nor a conventional hydrostatic bearing, but a combination of a novel radially moveable and self-adjusting support member in combination with conventional mechanic bearings and using some of the technologies of conventional hydrostatic radial bearings.

SUMMARY OF THE INVENTION

It is the aim and object of the invention, to provide a radial bearing to revolvable members, including to the rotors of hydrostatic pumps or motors, which can obtain an almost eternal life, maintain a perfect centration in mechanical bearings, adjust itself to consisting conditions and which maintain a very high efficiency over a long life in a small space and at little cost.

The details of the object of the invention will be understood from the detailed description of the preferred embodiment and from the claims.

As concise and short definition of the invention may read as follows:

(1) An assembly including an element, which is capable to carry a load, borne for centred rotation in a pair of endwards located bearings which are fastened a body, wherein at least one radially moveable support member is provided relatively to the axis of the said element on the opposite side of said element diametrically of the direction of said load which said element carries, wherein said support member has a bearing face complementary to a respective outer face of said element and facing said outer face of said element, wherein said bearing face is interrupted by a hydrostatic fluid pressure pocket extending through said bearing face into said support member and forming with said bearing face a hydrostatic bearing, wherein portions of said bearing face are forming the sealing land of said fluid pressure pocket, wherein said support member is mounted radially moveable in a limted extent on a portion of said body; wherein a source of fluid under pressure is provided and communicated to said fluid pressure pocket to provide fluid and a pressure therein to said pocket to provide to said pocket a capability to carry a load by said pressure; and,— wherein a passage is provided from said source to said fluid pressure pocket to carry said pressure and said fluid from said source to said pocket.

or; as:

(2) The assembly of 1, wherein said passage extends through said body and through said support member, and wherein suitable seal means are provided around said passage and between said body and said member which are suitably capable of sealing said passage while they are permitting a radial movement of said member in a limited extent.

(3). The assembly of 1, wherein said element carries an axially directed load and said member carries a major portion of said load by supporting said element.

(4) The assembly of 1, wherein said element is a rotor and carries a radially directed load and said member carries a major portion of said radial load by supporting said rotor.

(5) The assembly of 1, wherein a plurality of support members are provided.

(6) The assembly of 5, wherein said support members are acting in unison.

(7) The assembly of 2, wherein said element is a rotor and carries a radial load in its medial portion, wherein at least two support members are provided to carry a major portion of said load in unison, and wherein said support mambers are located laterally of said medial portion.

(8) The assembly of 2, wherein said rotor is a rotor of a fluid flow facilitating machine, wherein said rotor contains fluid intaking and expelling working chambers, said load is excerted onto said rotor by fluid in said working chambers, and said support members are suitably located to carry said load at substantially equal portions of said major portion of said load.

(9) The assembly of 8, wherein said members are radially moveable in two opposite directions and include pairs of said bearing faces and of said pockets and sealing lands on radially opposite directions of said rotor and said passage means are provided to said pockets on both of said opposite directions.

(10) The assembly of 9, wherein said assembly is provided in a radial chamber fluid flow facilitating machine.

DESCRIPTION OF THE PREFERRED EMBODIMENTS

Figure 1:
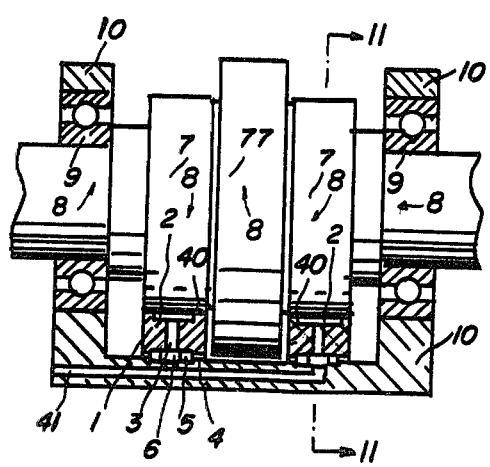
FIG. 1 is a longitudinal sectional view through one embodiment of the invention.
Figure 2:
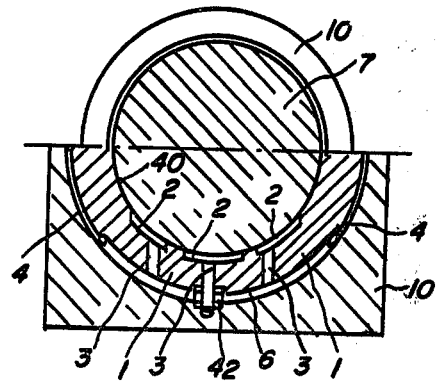
FIG. 2 is a cross-sectional view through FIG. 1 along the line II—II.

In FIG. 1 and 2 a heavy or radially heavy loaded rotor 8 is borne in ball or roller bearings 9, which are located in a housing or bearing bed 10. So far the arrangement is quite common and well known. According to the invention the rotor 8 is considered to be either extremely heavy by itself or it be loaded by a heavy radial load. Further the rotary revolutions might be very high. The rotor bearings 9 may be of relatively small size by reasons of design requirement or like.

Under such conditions as described, the life time of the usual on common bearings 9 would become very short and the life time may not be sufficient to satisfy the requirements.

In such cases, the invention becomes applied. In accordance with the invention, the rotor becomes at least one, but preferably a pair of circular outer faces 7. Contrary to the direction of the load and opposite diametrically of the load of the rotor 8 the support member (s) 1 are supplied. Support members 1 are located in the housing 10 and embrace partially the respective outer face or faces 7. The support member (s) 7 is (are) radially flexibly mounted in housing 10 in order that they can be pressed against the said outer face or faces 7. Adjacent to the said bearing face 7 the respective support member 1 has a slide - and seal - face 40, which is in short also called bearing face. Seal face 40 slides along the bearing face 7 and seals therealong. In order to prevent friction or to reduce friction between the outer face(s) 7 and the seal face(s) 40 fluid pressure lubrication pockets 2 are provided in the said bearing faces on seal face. They might also be provided in the bearing face 7 if so desired. Fluid under pressure is led from a fluid pressure supply source through passage(s) 41 and 3 into said fluid pressure pocket(s) 2. When a high support of the rotor is desired, the dimensions of the fluid pressure pockets(s) 2 and their surrounding sealing lands which are formed by the remaining rest together with the respective pressure in the fluid therein are so dimensioned and so located, that the said fluid pressure in said pocket(s) 2 and the respective sealing land(s) almost carry the entire weight or load of the rotor 8. Thereby the arrangement of the invention obtains, that the load of the rotor onto the bearings 9 is reduced to a small fraction of the weight or load of rotor 8. Accordingly the invention materializes a long satisfactory life of the setting bearings 9 under little load thereon. The major portion of the load or weight of the rotor 8 is now borne by the support member(s) of the invention.

The bearings 9 however must have a certain clearance, because otherwise they can not revolve. The outer face(s) of rotor 8 and the seal face(s) 2 of the support member(s) 1 may during time wear off a little. It is also difficult and theoretially even almost impossible, to manufacture the seal face(s) 2 absolutely around the same axis of the rotor as the seats of the bearings 9 in the housing 10. Accordingly, the application of a fluid bearing in combination with roller or ball bearings is difficult, or practically impossible.

It is therefore an achievment of the invention, that the support member(s) 1 of the invention is not a fluid bearing, but a support member. That is due to the fact, that the support member(s) 1 of the invention is not fixed stationary in the housing 10, but only located therein radially moveable towards and from the bearing face(s) 7 of the rotor 9. A pin or arrester 42 may prevent the rotation of the support member relatively to the housing. Also according to the invention, a free space 4 is provided between housing 10 and support member(s) 1. This space has the purpose to make the radial movement of the support member possible at least in a little extent. A fluid pressure chamber 6 is according to the invention provided between the housing 10 and the support member(s) 1. Fluid pressure space 6 is sealed by radially aligning or flexible seal members 5. Fluid under pressure is led through passage 41 into the said fluid pressure chamber 6 and from there through the support member(s) 1 into the fluid pressure pocket(s) 2. Thus, the support member(s) 1 float under the differently directed fluid pressures in pockets 2 and spaces 6 within space 4 with the provision, that the acting pressure sum out of space(s) 4 is slightly larger than the sum of acting pressure force(s) out of pocket(s) 2. Thereby the support member(s) 1 is slightly pressed against the bearing face(s) 7 to seal the fluid pressure pocket(s) 2 which now bear the main load or weight of rotor 9. If the bearing face(s) 40 or the bearing face(s) 7 wear off over time, the support member(s) 1 move under the fluid pressure in spaces 6 automatically closer against the bearing face(s) 7 of the rotor, so, that the seal between faces 7 and 40 remains alltimes maintained. In case of proper dimensioning and building the support member(s) 1 of the invention works perfect and supplies an almost eternal life to the rotor 8 and the bearings 9.

Thus, according to the invention, the bearings 9 can be freed from almost all of the load, remain thereby accurate and can serve as concentration of the location of the rotor and its exact running around a definitely fixed axis. The bearings 9 now obtained the function of accurate setting of the rotor, while the support member(s) of the invention obtained the function of bearing the major load of rotor 77 - 9 and to supply a long life of load carrying capability. The medial portion 77 of In FIGS. 3 and 4 the housing 31 contains a fluid pump or fluid motor having radially expanding and subtracting working chambers 64, which take in and expell fluid by the movement of the displacment members 61. The stroke of the displacement actuator members 61 is effected by the actuator 63 and slide-shoes 62, which are placed between the actuator and the displacement members 61 and 63. Such arrangements of fluid pumps or motors are generally known and also known ist to transfer fluid into and out of rotor 87 by control body 65.

An unavoidable experience in such fluid machines with radially acting working chambers and achsially supplied and expelled flow of fluid is, that a heavy load under pressure appears in rotor 87, whereby a very high load is transfered from the rotor 87 to the rotor - bearings 19. Under this heavy load the rotor bearings 19 have only a very limited lifetime, when the pressure in the machine is high and when the revolutions of the rotor 87 are also very high. The life time of the machine is then so short, that as rong desire exists to increase the life time of such pumps. That is also necessary in order that the life tim of the device is equal to the machine, which is operated by the fluid pump or fluid motor. To set bigger rotor bearings 19 is not convinient, because bigger bearings give more friction and reduce the efficiency of the machine.

The solution to this problem is, to set a support member or members of the invention onto the rotor 87 of the pump or motor. This is done, according to the invention by providing outer faces 17 on rotor 87, support member seats 35 in the housing 31 or cover thereof and to insert the support members 11 of the invention between said bearing faces and said seats. Accordingly support members 11 are sealing with their seal faces 40 along the bearing faces 17 of the rotor. The arrangements are best done on both ends of the medial portion of rotor 87. If however, the pump or motor has a plurality of working chamber groups, a bearing face and the invention's arrangement may also be set medially between two working chamber groups onto the rotor.

Thus, fluid under pressure is led either from a fluid-pressure source or from the respective fluid passages through control body 65 by fluid passages 27 or 28 to the fluid pressure spaces 16 or 26 and from there through the passages 13 or 23 of the support members 11 or 21 into the respective fluid pressure pockets 12 or 22. The fluid pressure in the fluid pressure pockets 12 or 22, which are sealed by the bearing faces 40 along the outer faces 17 together with the fluid pressure between the seal faces 40 and the bearing faces 40 are now bearing the major portion of the load of the rotor 78.

The seal inserts 14 or 24 are sealing the fluid pressure spaces 16 or 26 towards the support members 11 or 21 and towards the support member seats 35. It is essential to provide a small free space 29 radially between the support member seats 35, which may be cylindrical bores, and the outer faces of the respective support member 11 or 21 in order, that the support members 11 or 21 can freely radially move towards the bearing faces 17 or away therefrom. Because otherwise, the aim of the invention can not be perfectly obtained. Because if fixed, which means radially not moveable, support member 11 or 21 might wear off and the perfectness of sealing along the bearing face(s) 17 might then be disturbed. This radial ability to move radially is an important feature of the invention and makes the difference between a hydrostatic bearing and a support member of the invention.

Rotor 87 may be driven by shaft 32 or rotor 87 may drive the shaft 32 depending, whether the rotor acts as a pump or as a motor.

Figure 3:
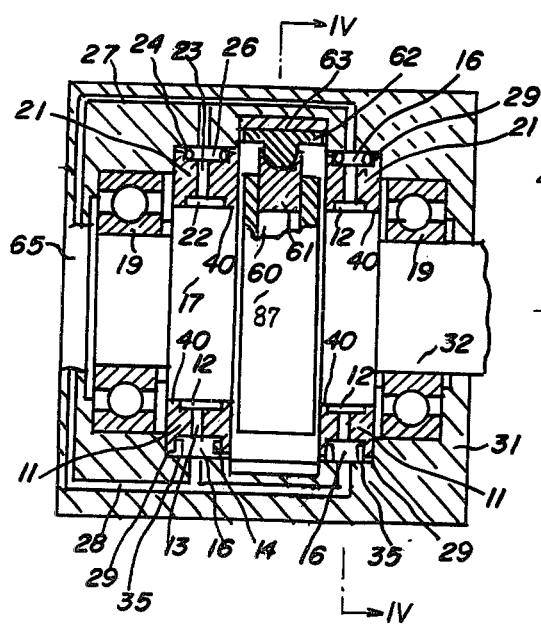
FIG. 3 is a longitudinal sectional view through another embodiment of the invention, and, FIG. 4 is a cross-sectional view through FIG. 3 along the line IV—IV.
Figure 4:
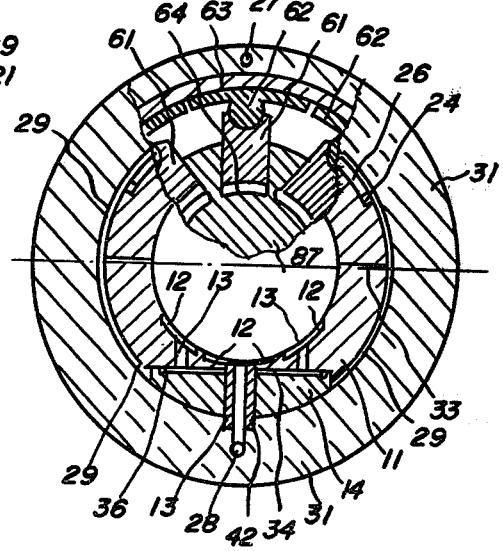

For such pumps or motors, which can revolve in two directions, or which can be loaded in two different radial direction, it is suitable to provide support members 11 and 21 of the invention diametrically opposed relatively to the rotor 87, so, as shown by way of example in FIGS. 3 and 4. The support member 11-21 may then either bearing with radial clearance between its outer face and the respective seat 35 for the provision of space(s) 29 in order to assure the desired radial moveability of the invention, or the support members 11, 21 may be separated half-rings, as shown in FIG. 4. If they are half-ring-portions, there may appear a space 33 between support members 11 and 21.

The radially adaptable seal members 14 or 24 may either be flexible, plastic or rubber-like seals, or they may be metallic seals with radial move-ability relatively to the support members 11,21 and/or to the seats 35. The upper portion of FIG. 4 demonstrates an example of a flexible seal 24, while the bottom-portion of FIG. 4 demonstrates in principle a metallic seal with said radial move-ability.

Plastic seals 36 may be added to the metallic seal 14 if so desired. An arresting means, for example pipe 42 may be inserted into the housing and the seal 14 and/or the support member 11 or 21 in order to prevent rotation of the support members 11 or 21 relatively to the housing 31 or re;atively to the support member bed 35.

Each support member 11, 1 or 12 may either have a single fluid pressure pocket 2,12 or 22 or a plurality thereof. When a plurality of fluid pressure pockets 2,12,22 are provided, it is suitable to provide also a respective number of passages 3;13,23 to communicate the respective fluid pressure chambers 6,16,26 with the respective fluid pressure pockets, like 2,12,22.

For an accurate operation the forces of pressure in fluid between the seal faces 40 and the bearing faces 7,17 has also to be considered. A plurality of fluid pressure pockets gives slightly different results from a single fluid pressure pocket. Surface condition and material play a big role to obtain a maximum of bearing force with the most less friction. The details of an actual design or of actual designs may be obtained from the inventor's research institute if so desired.

While some example of the support member of the invention have been shown, it should be understood, that they may be differently formed for different purposes, including planes, if the rules of the invention are obeyed.

I claim:

1. An assembly including
   an element, which is capable to carry a load, borne for centred rotation in a pair of endwards located setting bearings which are fastened to a body,
   wherein at least one limitedly moveable support member is provided relatively to the axis of the said element on said element in the direction of said load which said element carries,
   wherein said support member has a bearing face complementary to a respective outer face of said element and facing said outer face of said element,
   wherein said bearing face is interrupted by a hydrostatic fluid pressure pocket extending through said bearing face into said support member and forming with said bearing face a hydrostatic bearing,
   wherein portions of said bearing face are forming the sealing land of said fluid pressure pocket,
   wherein said support member is subjected to the thrust in fluid in a pressure chamber which is located between said body and said support member and said support member mounted radially moveable in a limited extent on a portion of said body in a direction contrary to said direction of said load; wherein a source of fluid under pressure is provided and communicated to said pressure chamber and to said pocket to provide fluid and a pressure therein to said pocket to provide to said pocket a capability to carry a load by said pressure; and,
   wherein a passage is provided from said source to said fluid pressure pocket to carry said pressure and said fluid from said source to said pressure chamber and to said pocket, whereby said support member is pressed by said thrust in said pressure chamber against said element in said direction contrary to said direction of said load into sealing engagement of said bearing face of said support member on said outer face of said element.

2. The assembly of claim 1,
   wherein said passage extends through said body and through
   said support member, and wherein suitable seal means are provided around said passage and between said body and said member which are suitably capable of sealing said passage while they are permitting a radial movement of said member in a limited extent.

3. The assembly of claim 2,
wherein said element is a rotor and carries a radial load in its medial portion,
wherein at least two support members are provided to carry a major portion of said load in unison,
and wherein said support members are located laterally of said medial portion.

4. The assembly of claim 2,
wherein said rotor is a rotor of a fluid flow facilitating machine,
wherein said rotor contains fluid intaking and expelling working chambers, said load is excerted onto said rotor by fluid in said working chambers, and said support members are suitably located to carry said load at substantially equal portions of said major portion of said load.

5. The assembly of claim 4,
wherein said members are radially moveable in two opposite directions and include pairs of said bearing faces and of said pockets and sealing lands on radially opposite directions of said rotor and said passage means are provided to said pockets on both of said opposite directions.

6. The assembly of claim 5,
wherein said assembly is provided in a radial chamber fluid flow facilitating machine.

7. The assembly of claim 1,
wherein said element carries an axially directed load and said member carries a major portion of said load by supporting said element.

8. The assembly of claim 1,
wherein said element is a rotor and carries a radially directed load and said member carries a major portion of said radial load by supporting said rotor.

9. The assembly of claim 1,
wherein a plurality of support members are provided.

10. The assembly of claim 9,
wherein said support members are acting in unison.

11. An assembly including an element borne by a body,
wherein said element is capable to carry a load and borne on a pair of bearing means which are fastened to said body;
wherein at least one limitedly movable support member is provided on said body and relatively to said element along a portion of said element to face said portion of said element in the direction of said load which said element carries;
wherein said support member has a bearing face complementary to a respective outer face of said element and facing said outer face of said element;
wherein said bearing face of said support member is interrupted by a hydrostatic fluid pressure pocket which extends through said bearing face into said support member and which forms together with said bearing face a hydrostatic bearing;
whereby portions of said bearing face are forming the sealing land of said fluid pressure pocket around said fluid pressure pocket,
wherein a source of fluid under pressure is provided and communicated to said fluid pressure pocket to provide fluid and a pressure therein to said pocket to provide to said pocket a capability to carry a load by said pressure;
wherein a passage is provided from said source to said fluid pressure pocket to carry said pressure and said fluid from said source to said pocket,
wherein said support member has an inner portion which forms said bearing face with said fluid pressure pocket while it also has an outer portion on the opposite end of said inner portion of said support member,
wherein said outer portion faces said body and an arresting device is provided to said body and to said support member to limit said support member to move in one direction relatively to said body and to said moveable element but to prevent said support member to move in other directions different from said one direction;
wherein a fluid pressure chamber is provided between said body and said support member and communicated to said passage and thereby to said pressure to press said support member towards said moveable element in said one direction and thereby in the direction contrary to said direction of said load;
wherein said fluid pressure chamber is sealed along said body and said support member to prevent escape of fluid out of said pressure chamber,
wherein the direction of said load defines the projections of said bearing face, fluid pressure pocket and of said pressure chamber,
wherein the cross-sectional area of the said projection of said pressure chamber exceeds the cross-sectional area of the said projection of said fluid pressure pocket in a predetermined limited extend; and,
whereby said sealing land of said fluid pressure pocket is pressed against a portion of said outer face of said element to engage said element and thereby to prevent escape of excessive leakage out of said fluid pressure pocket.

12. The assembly of claim 11,
wherein said passage extends through said body and through said support member, and wherein suitable seal means are provided around said passage and between said body and said member which are suitably capable of sealing said passage while they are permitting a movement of said member in a limited extent in said one direction.

13. The assembly of claim 12,
wherein said element is a rotor and carries a radial load in its medial portion,
wherein at least two support members are provided to carry a major portion of said load in unison, and wherein said support mambers are located laterally of said medial portion.

14. The assembly of claim 11,
wherein said element carries an axially directed load and said member carries a major portion of said load by supporting said element.

15. The assembly of claim 11,
wherein said element is a rotor and carries a radially directed load and said member carries a major portion of said radial load by supporting said rotor.

16. The assembly of claim 11,
wherein a plurality of support members are provided.

17. The assembly of claim 16,
wherein said support members are acting in unison.

18. An assembly of a radial bearing which carries a revolvable element such as a rotor on a body which forms at least partially a housing of said bearing, wherein common bearings are provided to bear said rotor on said body and at least one additional novel fluid operated support member is provided on said body to engage said rotor and to carry a certain portion of the radial load of said rotor in order to reduce the radial load of said rotor to said common bearings, wherein said support member is located between portions of said body and said rotor, said rotor forms at least one outer face and said support members forms at least one bearing face of a configuration complementary to said outer face and able to engage said outer face;

wherein a pressure chamber is provided between said body and said support member and supplied with fluid under pressure from a respective fluid pressure supply source and sealing means and holding means are provided between said body and said support member to prevent escape of fluid out of said pressure chamber; to permit a movement of said support member in a direction towards said rotor but to prevent any unperfect movement of said support member in any direction different from said direction towards said rotor, and, wherein the cross-sectional area through said pressure chamber is suitably, dimensioned in combination with the rate of said pressure to press said support member against said rotor and thereby said bearing face against said portion of said outer face with the respective force to carry said certain portion of said load of said rotor.

19. The assembly of claim 18, wherein said support member is provided with a fluid pressure pocket which extends through said bearing face into said support member and communicates by a passage through said support member to said pressure chamber, while said bearing face forms a sealing land around said fluid pressure pocket, wherein the corossectional area of the projection of said chamber in the direction of said load exceeds the cross-sectional area of the projection of said fluid pressure pocket in the said direction of said load; and;

wherein said support member is pressed by said pressure chamber towards said rotor, whereby said sealing land of said bearing face engages said outer face and seals therealong to prevent excessive escape of fluid out of said fluid pressure pocket while the pressure in the fluid in said fluid pressure pocket carries a major portion of said certain portion of said load of said rotor;

whereby said fluid in said pocket carries said major portion of said certain load without major friction and assures an efficient bearing of said certain load without major losses by friction or leakage of pressurized fluid.

20. The assembly of claim 19, wherein said load is acting on a medial portion of said rotor, said common bearings are provided with at least one of them endwards of said medial portion in one axial direction and at least another common bearing of them endwards of said medial portion in the other axial direction; and;

wherein at least two of said support members, pressure chambers, seal means and holding means, bearing faces and outer faces are provided in said assembly, whereof at least one of said members, seal means, holding means, chamber, bearing faces and outer faces are located endwards of said medial portion in one axial direction and an equal number of said members, seal means, holding means, chambers, bearing faces and outer faces are located endwards of said medial portion in the other axial direction of both axial directions.

21. The assembly of claim 20, wherein said outer faces are cylindrical faces, said bearing faces are portions of cylindrical faces which are able to embrace said outer faces with an angular peripheral extension of at least sixty degrees whereof halfs of said degrees are symmetrically provided relatively to the axis of said direction of said load;

wherein said support members have substantially rectangular cross-sectional shapes, wherein the shorter directions of said rectangular shapes are extending in a direction parallel to the axis of said rotor and the longer directions of said rectangular shapes are extending normal to the directions of said shorter directions and normal to said axis of said rotor, and;

wherein said pressure chambers and said fluid pressure pockets have cross-sectional shapes of short and elongated extensions with the said short extensions parallel to said axis of said rotor and said elongated extensions normal thereto and radially and peripherally of said axis of said rotor, whereby said support members supplies a forceful bearing support to said rotor at a short axial length with the ability to carry said major portion of said load of said rotor extremely close to said load for the elimination of axially long bearings of limited capacity and for the elimination of deformations or vibrations of axially long portions of said rotor;

while said common bearings are obtaining by said carrying of said certain portion of said load by said support members a respective reduction of the load which they have to carry and thereby obtain an extended life of accurateness of bearing of said rotor.

22. The assembly of claim 19, wherein said rotor is a rotor of a fluid flow facilitating machine, wherein said rotor contains fluid intaking and expelling working chambers, said load is excerted onto said rotor by fluid in said working chambers, and said support members are suitably located to carry said load at substantially equal portions of said major portion of said load.

23. The assembly of claim 22, wherein said members are radially moveable in two opposite directions and include pairs of said bearing faces and of said pockets and sealing lands on radially opposite directions of said rotor and said passage means are provided to said pockets on both of said opposite directions.

24. The assembly of claim 23, wherein said assembly is provided in a radial chamber fluid flow facilitating machine.

* * * * *